(12) United States Patent
Snyder

(10) Patent No.: US 7,969,603 B2
(45) Date of Patent: Jun. 28, 2011

(54) PRINT DRIVER BASED MARKETING SYSTEM AND METHOD

(75) Inventor: Trevor James Snyder, Newberg, OR (US)

(73) Assignee: Xerox Corporation, Norwalk, CT (US)

( * ) Notice: Subject to any disclaimer, the term of this patent is extended or adjusted under 35 U.S.C. 154(b) by 268 days.

(21) Appl. No.: 12/334,925

(22) Filed: Dec. 15, 2008

(65) Prior Publication Data

US 2009/0094135 A1 Apr. 9, 2009

Related U.S. Application Data

(63) Continuation of application No. 11/695,858, filed on Apr. 3, 2007, now Pat. No. 7,474,433.

(51) Int. Cl.
*G06F 3/12* (2006.01)
*G06K 15/00* (2006.01)

(52) U.S. Cl. ........ 358/1.15; 358/1.13; 358/1.1; 358/1.9; 358/1.14

(58) Field of Classification Search .............. 358/1.1, 358/1.2, 1.6, 1.9, 1.11, 1.13, 1.14, 1.15, 1.16, 358/1.17, 1.18, 407, 468, 400, 401, 500, 358/501; 705/26, 27, 29; 717/168; 719/322, 321, 327; 347/5; 399/1, 8, 38

See application file for complete search history.

(56) References Cited

U.S. PATENT DOCUMENTS

| | | |
|---|---|---|
| 5,580,177 A | 12/1996 | Gase et al. |
| 6,694,384 B1 | 2/2004 | Moeller et al. |
| 7,124,097 B2 | 10/2006 | Claremont et al. |
| 2002/0067504 A1 | 6/2002 | Salgado et al. |
| 2002/0072998 A1 | 6/2002 | Haines et al. |
| 2004/0153415 A1 | 8/2004 | Adkins et al. |
| 2005/0074246 A1 | 4/2005 | Hayward et al. |
| 2005/0141012 A1 | 6/2005 | Oomura |
| 2006/0066907 A1 | 3/2006 | Nakata et al. |
| 2006/0152760 A1 | 7/2006 | Hong et al. |
| 2006/0241958 A1 | 10/2006 | Blanchard, Jr. et al. |
| 2006/0242030 A1 | 10/2006 | Blanchard, Jr. et al. |
| 2006/0274395 A1 | 12/2006 | Harris et al. |

*Primary Examiner* — Dov Popovici
(74) *Attorney, Agent, or Firm* — Pepper Hamilton LLP

(57) ABSTRACT

A method of providing access to an online marketplace via a printer driver that is in communication with a networked printing device. The marketplace offers printer capabilities which are compatible with the networked printing device. The computing device receives a request to purchase one of the printer capabilities for the networked printing device. The printer driver associates the purchased printer capability with the computing device.

20 Claims, 5 Drawing Sheets

PRINT DRIVER BASED MARKETING SYSTEM AND METHOD

CROSS REFERENCE TO RELATED APPLICATIONS

This application is a continuation of, and claims priority to, U.S. patent application Ser. No. 11/695,858, filed Apr. 3, 2007, the disclosure of which is incorporated by reference herein in its entirety.

Not Applicable

BACKGROUND

Printers are common peripheral devices attached to computers. A printer allows a computer user to make a hard copy of documents that are created in a variety of applications and programs on a computer. To function properly, a channel of communication is established between the printer and the computer to enable the printer to receive commands and information from the host computer. Common ways of accomplishing this are through the use of a connective cable directly between the printer and a port on the host computer or through a network connection.

Once a connection is established between the workstation and the printer, the document to be printed is translated into a format that the printer recognizes. To accomplish this, software is loaded onto the host computer that converts code representing a document to be printed into a format that the printer can understand. This software is referred to as a printer driver.

Currently printers may be sold with various options or features, and they may be sold with ancillary products such as toner or paper. Various patents also teach using a computer to connect to a network for purchasing and supplying options, features, or products for a printer. U.S. Patent Application Publication Number 2006/0152760, the disclosure of which is incorporated herein by reference in its entirety, teaches an automatic supply ordering system for purchasing consumable or replacement parts in a printer. U.S. Patent Application Publication Numbers 2002/0072998, 2005/0074246, and 2006/0242030, the disclosures of which are incorporated herein by reference in their entirety, teach supply systems for ordering compatible parts of a printing device. However, these systems have limited functions and do not enable customization of printer functions for individual users on a network.

U.S. Patent Application Publication Number 2002/0067504, the disclosure of which is incorporated herein by reference in its entirety, teaches a method and apparatus upgrading a printer driver by searching the web for a new version of the printer driver software. However, this method is an automatic upgrade process and does not provide the user with the opportunity to customize upgrades or select additional items.

The disclosure contained herein describes the methods of resolving one or more of the problems discussed above.

SUMMARY

In one embodiment, a method may provide access to an online marketplace via a printer driver in a computing device that is in communication with a networked printing device. A printer capability that is compatible with the networked printing device may be offered in the online marketplace. A request to purchase the printer capability for the networked printing device may be received from the computing device. The printer capability may be associated with the computing device.

The printer capability may include one or more of a supply, feature and service for the networked printing device. In one embodiment, the printer capability may include one or more of black toner or ink, color toner or ink, a battery, paper, a cleaning supply, another consumable, a fuser, or another printer mechanical part. In another embodiment, the printer capability may include one or more of an enhanced photo feature, printing speed, quality adjustment, duplex capability and a printing capability networking option. In an alternative embodiment, the printer capability may include one or more of a printer mode, color correction, manual, service contract, on-site repair and a warranty. In one embodiment, the printer capability may be stored in the printing device as one or more bits in the non-volatile memory, such as random access memory, of the printing device.

In one embodiment, the system may track the use of the printer capability by the computing device. Offering a printer capability may include receiving networked printing device information via the printer driver, accessing a database containing status information about the networked printing device, and choosing the printer capability based on the status information. In one embodiment, providing access to an online marketplace may include an online retail location electronically transacting commerce over a communications network. Associating the printer capability with the computing device may include downloading an updated printer driver enabling the printer capability for the networked printing device and installing the updated printer driver in the computing device. In one embodiment, the status information may include a list of non-enabled printer capabilities available to the networked printing device. In one embodiment, all computing devices connected to the network printing device may have access to the printer capability.

Access to the online marketplace may be provided via at least one input device on a printer driver properties screen. Each input device may access a particular location in the online marketplace. The input device may include one or more of a paper input, an output options input, a troubleshooting input, a color connection input, and a purchase ink input.

In one embodiment a method may provide, via a printer driver in a computing device that is in communication with a networked printing device, access to an online marketplace. A printer capability may be offered in the online marketplace, wherein the printer capability is compatible with the networked printing device. A request to purchase the printer capability for the networked printing device may be received from the computing device. An updated printer driver enabling the printer capability for the networked printing device may be downloaded. In one embodiment, all computing devices on the network have access to the printer capability.

In one embodiment a printer driver may include computer readable program code capable of being executed by a computer. The printer driver may include computer readable code for connecting a marketplace input to an online marketplace. Computer readable code may communicate with a networked printing device to retrieve printing device information. Computer readable code may send the printer device information to a server. Computer readable code may download and install an updated printer driver containing a printer capability purchased from the online marketplace. Computer readable code may display the printer capability and may track the use of the printer capability. In one embodiment, the printer capability may include one or more of a supply, feature, firmware update or service for the networked printing device. In one embodiment, tracking the use of the printer capability may include calculating the consumption of the printer capability by the printing device.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Figure 1:
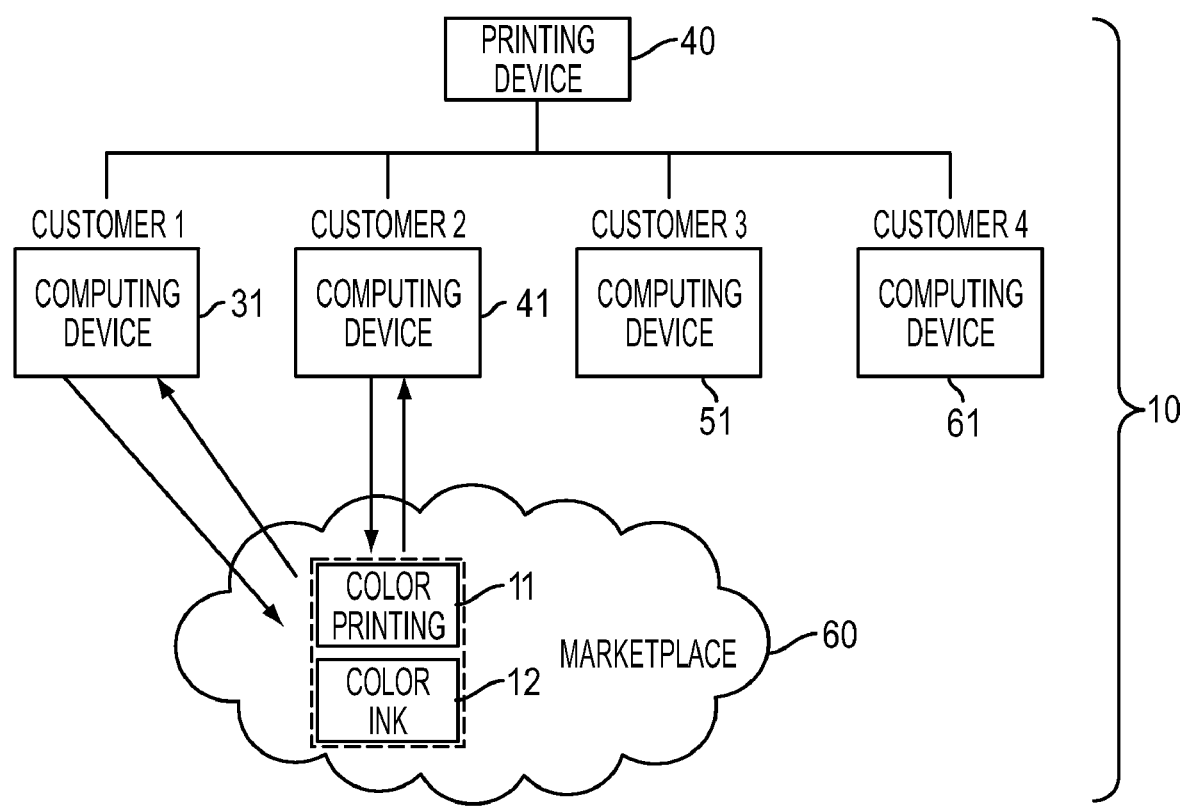
FIG. 1 depicts one embodiment of a system that enables customers to purchase printer capabilities from an online marketplace.

In one embodiment, referring to FIG. 1, a computing device 31 may be part of a network 10 of computing devices such as a local area network (LAN), wide area network (WAN), the Internet, or another communication network. Computing devices may include, but are not limited to computers, cell phones, personal digital assistants, gaming systems, and/or other devices capable of communicating in a networked environment. A networked computing device may be associated with one or more printing devices 40. A printing device may include, but is not limited to, a printer, copier, and/or scanner. A printing device may also contain a combination of functions. The networked computing devices all may be in one area or they may be spread out in multiple locations. In one embodiment, multiple computing devices are all in one room. In another embodiment, the computing devices are located in different rooms in the same building or even distributed among different buildings.

In one embodiment, a printer driver may be installed on a computing device in a network and may contain information about an associated printing device. Once the printer driver is installed on the computing device, a customer may use the printer driver to access a printing device that is also linked to the communications network. As displayed in FIG. 1, any number of computing devices 31, 41, 51, 61 may each have a printer driver providing access to one or more printing devices. The computing devices of customer1, customer2, customer3, and customer4 are shown as connected to one network and connected to the same printing device 40. However, the computing devices could, in some embodiments, be interconnected through multiple communications networks and/or multiple printing devices. In one embodiment, each computing device may have access to a marketplace 60 via the communications network. The marketplace 60 is an online retail location where commerce is transacted electronically over a communications network.

Figure 2:
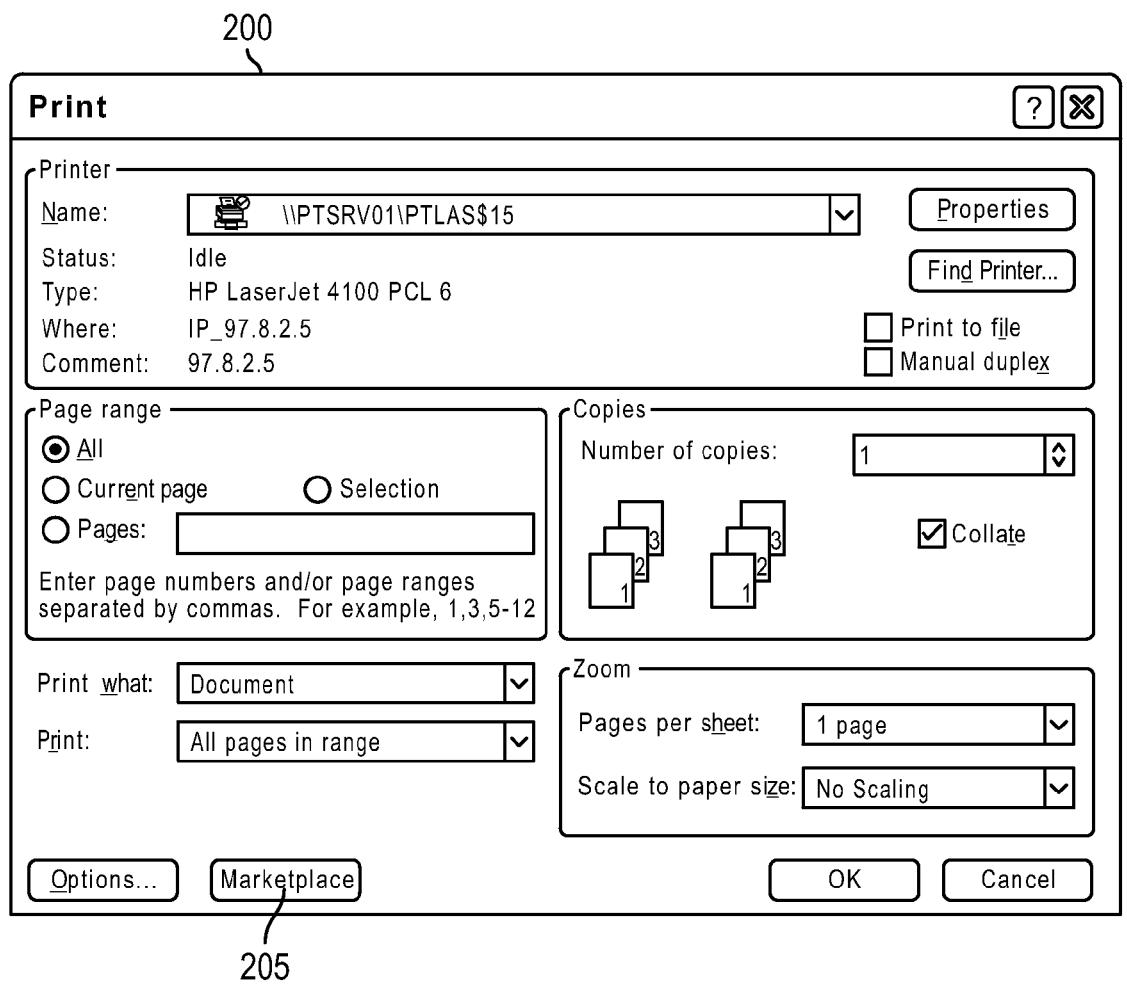
FIG. 2 depicts one embodiment of a system that enables a user to access an online marketplace through a printer driver screen.

As shown in FIG. 2, each computing device has a printer driver that provides the device user with a printer driver display screen 200 that enables the user to select a printing device along with various options for that printing device. A customer may access the online marketplace through the printer driver screen 200 on their computing device. As shown in FIG. 2, the online marketplace may be accessed through an input 205 such as a button, drop-down menu, or other device on a printer driver screen 200. By selecting the marketplace input 205 on the printer driver screen 200, a customer will be connected to the marketplace and a marketplace display screen will appear on the computing device.

Figure 3:
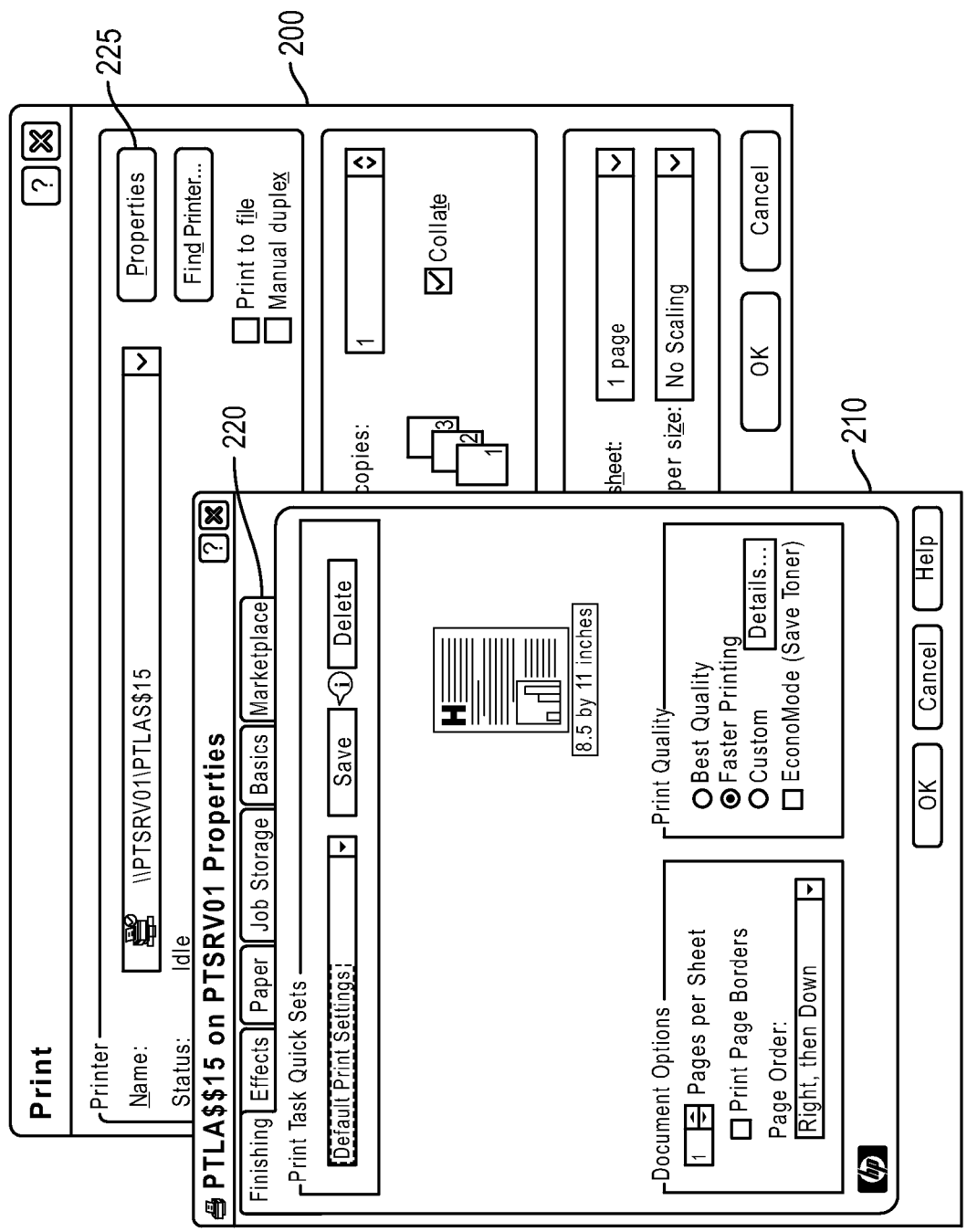
FIG. 3 depicts one embodiment of a printer driver properties screen.
Figure 4:
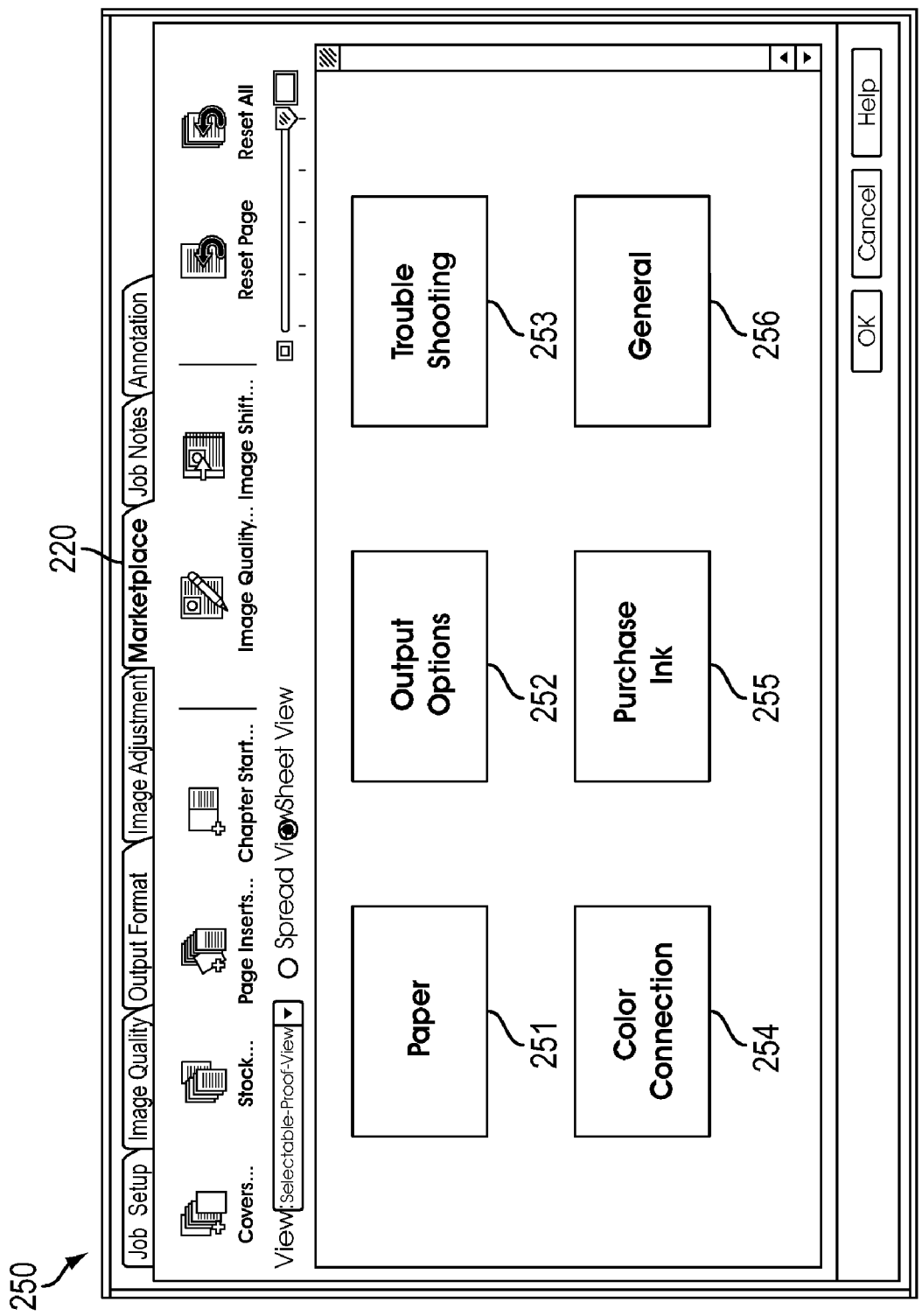
FIG. 4 depicts one embodiment of a marketplace tab.

Alternatively, the marketplace may be accessible via a second-level screen 210 that is accessible from the top-level screen 200 of the printer driver. FIG. 3 depicts one embodiment where the marketplace is accessible through a tab 220 on a printer driver properties screen 210 which is accessible via a properties input 225 on the top level screen 200. FIG. 4 shows one embodiment of another sub-level screen where a marketplace tab 220 is displayed. The marketplace screen 250 may contain various buttons or other input mechanisms to access different areas within the marketplace. In one embodiment the online marketplace is available via an Internet protocol (IP) address and includes several pages, each having a different web address and offering at least some different printer capabilities. A printer capability may include, but is not limited to, one or more of a supply, feature, printer firmware update, and/or service related to a printing device.

A printer capability may include supplies that are sent to the user or a designated location. Other printer capabilities may enable the user to enable specific features or functions of the printer for that particular user. The system may include various inputs, each of which opens a browser or tab with features available at the IP address corresponding to the input. For example, in the marketplace tab 220, there may be a paper input 251 which connects to an area in the marketplace that offers various printer paper quality options for a user. In another example, an output options input 252 may link the customer to an area of the marketplace for the purchase of a higher quality of printing or other output functions. Additionally, a troubleshooting input 253 may link to an area of the marketplace which allows a user to buy troubleshooting devices and/or services. A color connection input 254 may allow a user to change the color options on the printing device by purchasing new options such as, but not limited to, color printing and/or a different color correction. A purchase ink input 255 may provide a customer with ink options for the printing device. Alternatively, the customer may connect to a homepage, default page, or general page of the marketplace through a general marketplace input 256. Alternatively, or in addition, any of the inputs may link to an area in the marketplace containing free or purchasable items to print such as, but not limited to, birthday, congratulatory, sympathy, or get-well cards as well as layouts for calendars, brochures, pamphlets, and signs.

Figure 5:
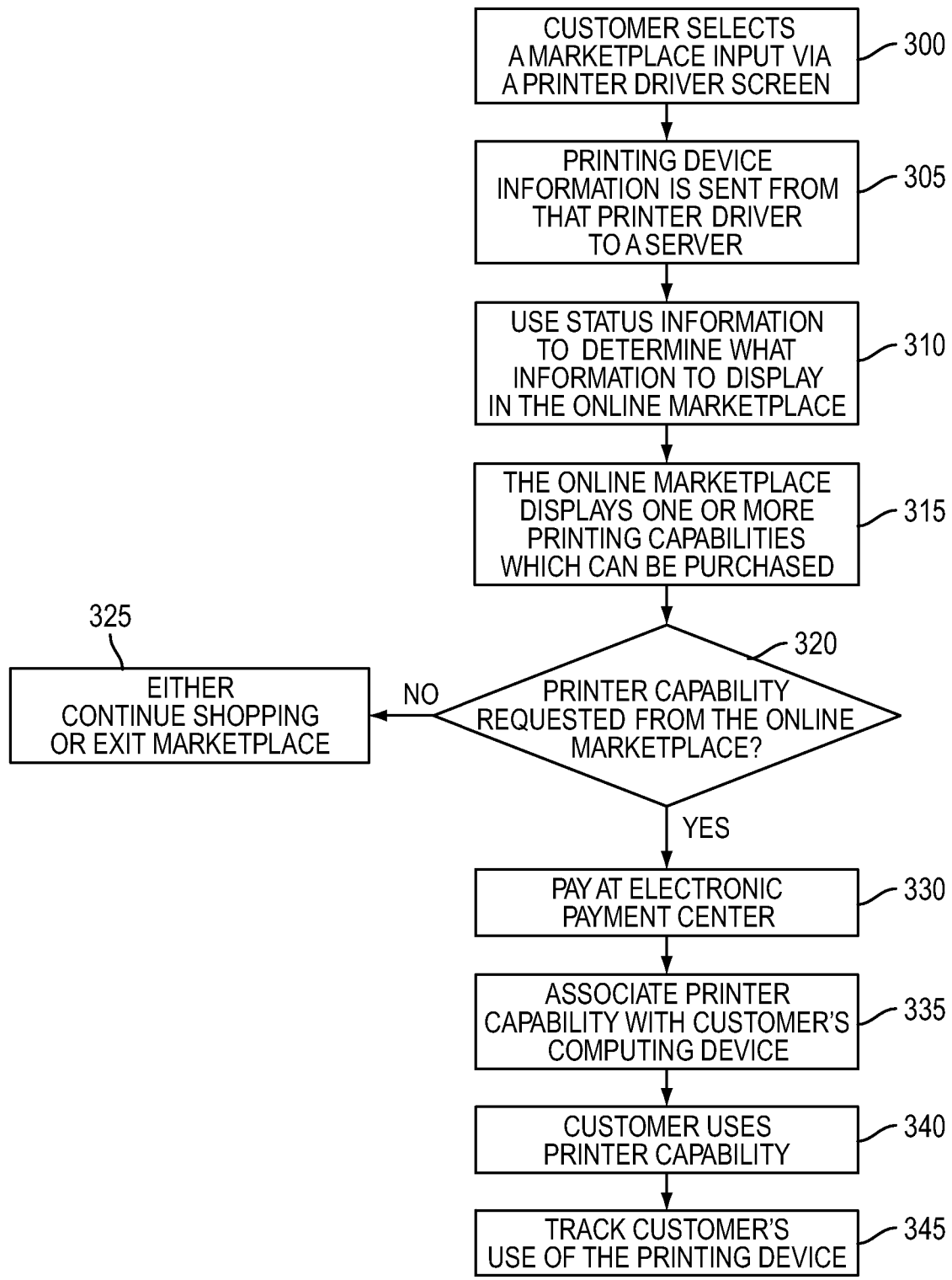
FIG. 5 depicts a flowchart of one embodiment of a printer driver sales channel method.

FIG. 5 describes one embodiment of what may occur when an input is selected on a printer driver screen to connect to the marketplace. After a customer selects one of the marketplace inputs 300, printing device information, which may include, but is not limited to information identifying the customer's printing device, may be sent from the printer driver to a server 305. In one embodiment, the server has access to a database. The database may contain status information about various printing devices and the customers or computing devices that access each printer driver. The printer status information may include, but is not limited to, information as to which printer capabilities on the particular printing device are enabled and/or what may be enabled. The database may also contain information as to what printer capabilities were previously purchased and which ones may still be purchased. This server may use this status information to determine what supplies, functions or other options to offer the customer via the online marketplace 310. The status information allows the customer to view one or more printer capabilities in the marketplace that correspond to the customer's printing device 315. For example, the server may use the status information to identify particular products that are relevant to the customer's printing device, such as replacement toner cartridges, specific cost-per-copy options, or other products. In some embodiments, the displayed printing capabilities 315 may be limited to those that are relevant to the customer's printing device. The displayed printer capabilities can be purchased by the customer.

Alternatively, in another embodiment, the customer can view some or all of the offered printer capabilities and supplies including, but not limited to, those printer capabilities that do not correspond with the customer's printing device. The customer instead may search within the marketplace for their specific printing device to find printer capabilities for their device.

A printer capability may include, but is not limited to one or more of a supply, feature, and service. Supplies may include, but are not limited to, black and color ink or toner, cleaning supplies for the printing machine, paper, overhead projector supplies, batteries, a fuser or other replacement parts or consumables that may be used with the printing device. In one embodiment, a customer may purchase a metered supplies option, also known as a cost-per-copy program. For example, a customer may pay a set amount and the printer, from the duration of the paid cost-per-copy program, will accept a different and/or reduced-price ink or toner that is associated with the cost-per-copy feature. In another embodiment, the purchase of a cost-per-copy program might involve the shipment of a new printer to the customer, where the new printer is capable of loading and printing with a different type of ink or reduced-price ink.

Features that a customer can buy may include, but are not limited to, faster printing, photo mode, quality adjustments, and duplex or networking options. In one embodiment, a customer may enable features on the printing device that are not currently available to the customer. For example, a company may have purchased a printer that is set to use only one default speed setting for each user. However, the printer may have a faster printing speed capability installed on it and that speed setting may only be available to customers having printer drivers that enable the faster speed setting. A customer of the networked printing device may buy the faster speed printer capability for the printing device by downloading an updated printer driver or updated printer firmware that enables the capability to the customer's computer.

Services may include, but are not limited to, service contracts, low and high toner or ink printer modes, low and high printer saturation modes, color corrections, media, manuals, service contracts, on-site repairs, warranties, and 24-hour repair assistance. In one embodiment, a customer may buy a particular printer mode. A customer may then print in a draft mode or a low coverage mode so that the print quality is desaturated, but the printed sheet contains the same resolution per copy. This embodiment may be used in conjunction with, or separate from, a customer buying a certain supply of ink or toner.

The marketplace may also contain some printer capabilities that are free to the customer. This free material may include, but is not limited to, graphics, downloadable games, free color print examples, clipart, cards, calendars, stationary, books, holiday content, and online help files. The marketplace may also offer surveys and free items to customers who complete the survey. Additionally, there may be an area in the marketplace that advertises sales, discounts and other specials. Also, there may be a capability to print a book or other publication of available content (for sale or free) for the given printer, thus making it easier to review, track and select desired content at any time.

Referring to FIG. 5, the online marketplace may display for sale a printer capability which is compatible with a customer's printing device 315. In one embodiment, a customer may send a request to purchase a printer capability 320. After the request is received, the system may allow the customer to purchase the printer capability. The customer may buy the printer capability at an electronic payment center 330. In one embodiment, an electronic payment center may allow a customer to use a form of payment such as a debit or credit card to purchase the printer capability. Alternatively, subscription-based purchases may be available and a purchase may be automatic so long as the customer's total purchases do not exceed a predetermined amount in a time period. If nothing is purchased, the customer may remain in the marketplace until the customer decides to purchase a printer capability or exits 325. In an alternative embodiment, the customer automatically exits the marketplace after a certain amount of time has elapsed.

After the customer purchases a printer capability from the online marketplace, the printer capability, which was purchased, may be associated with the customer's computing device 335. In one embodiment, the association may include, but is not limited to downloading and installing software such as an updated printer driver to the customer's computer to enable the printer capability on the printing device. In one embodiment, the printer capability will be displayed on the customer's printer driver screen on their computing device. In another embodiment, the printer capability may not be visible, and the printer capability may be automatically enabled via the printer driver for the customer. In either event, after the printer capability is associated with the printer driver, the customer may use that capability by accessing the printing device through their printer driver 340.

For example, a customer may select a button on the printer driver screen to connect with the photo mode area of the marketplace via the Internet. Based on customer or printer identification information received from the printer driver, the marketplace server may determine what printer capabilities may be offered to the customer in the marketplace. The marketplace will display various printer capabilities based on the status information from the server. The marketplace may display a photo mode printer capability that is contained within the customer's printing device, but is not currently enabled. The customer may purchase this feature through an electronic payment system in the marketplace. After the photo mode printer capability is purchased, the printer driver inside the customer's computer may be associated with the photo mode by downloading and installing the software activating it. The photo mode option may be enabled when the customer is using the printing device. The photo mode may be enabled only for the customer who purchased the printer capability in the marketplace.

In one embodiment, the printer capability may be available only to the customers who purchased the capability. For example, returning to FIG. 1, customer1, customer2, customer3, and customer4 may all be using different computing devices 31, 41, 51, 61 within a network. Furthermore, each customer may have a printer driver in their computing device which is linked to a common printing device 40. If customer1 purchases printer capabilities such as color printing 11 and use of color ink 12 (such as through color "clicks" in a cost-per-click sales model in which color ink is delivered in an predetermined or unlimited supply, but charges are made for each print or "click") from the online marketplace 60, these printer capabilities may be associated only with customer1's computing device 31. Therefore, the color printing option may be available only to customer1, and customer1 may make as many prints or "clicks" using color ink as were purchased for the printing device 40. If customer2 later becomes interested in color printing, customer2 may have to access the marketplace 60 to purchase the color printing option 11 and add color clicks in order to use the color printing feature. If customer2 purchases the color printing option, it then may be associated with customer2's computing device 41. This process may have to occur for each customer interested in using a printer capability. The printer capability may only be accessible to the customer who purchased that capability. Each customer who is interested in obtaining a capability may individually buy it from the marketplace 60.

In an alternative embodiment, customer1 may pay a different fee to allow a printer capability to be used by all the customers in the network. The fee paid by customer1 may allow customer2, customer3 and customer4 to use the printer capability for a limited or unlimited period of time. In one embodiment, customers who later join the network within a limited period of time may also access the printer capability from their printing device. In another embodiment, the printer capability will only be enabled for customers currently in the network when the printer capability is purchased. To allow multiple customers to access the printer capability, the printer driver from customer1's computing device 31 may communicate with the printing device. In one embodiment, the printer capabilities may be stored on the printing device. For example, each printer capability may be stored as a bit or set of bits in the non-volatile memory, such as non-volatile random access memory (NVRAM), of the printing device. After a printer capability is purchased, the bit may be set. In another embodiment, the printer drivers from the computing devices of customer1, customer2, customer3, and customer4 31, 41, 51, 61 may be updated to include the printer capability purchased by customer1.

Referring back to FIG. 5, the printer driver may have the ability to track the customer's use of the printing device 345. This tracking may be used when one or more consumable features, such as ink supply or copies, are purchased by a customer. As used herein, the words ink and toner are used interchangeably to refer to wet on dry material that forms an image or text on a substrate. In another embodiment, the tracking feature may be turned on or off depending on customer's purchases or preferences. For example, referring to FIG. 1, if color clicks is purchased by customer1 and customer2 and they are connected to the same printing device 40, then each printer driver may track the use of the copies by customer1 and customer2 to determine when each customer must buy a new supply.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
    receiving, at an online marketplace, status information from a printer driver in a computing device, wherein the printer driver is associated with a networked printing device in communication with the computing device;
    automatically determining a printer capability to offer based on the status information, wherein the printer capability is compatible with the networked printing device and is not enabled on the networked printing device;
    displaying the printer capability in the online marketplace;
    receiving a request to purchase the printer capability for the networked printing device; and
    downloading an update to the printer driver enabling the printer capability for the networked printing device.

2. The method of claim 1, further comprising:
    tracking usage of the printer capability.

3. The method of claim 2, wherein the tracking usage of the printer capability comprises tracking usage of the printer capability by the computing device.

4. The method of claim 1, wherein the printer capability comprises one or more of a supply, feature and service for the networked printing device.

5. The method of claim 1, wherein the downloading an update to the printer driver comprises downloading one or more of an enhanced photo feature, a printing speed, a quality adjustment capability, a color correction capability, a printer mode, a duplex capability and a networking capability.

6. The method of claim 1, wherein the downloading an update to the printer driver comprises installing the update to the printer driver in the computing device.

7. The method of claim 1, wherein the printer capability comprises one or more of a manual, a service contract and a warranty.

8. The method of claim 1, further comprising:
    storing the printer capability in a memory of the networked printing device.

9. The method of claim 1, wherein the displaying the printer capability in the online marketplace comprises displaying one or more printer paper quality options in the online marketplace.

10. The method of claim 1, wherein the displaying the printer capability in the online marketplace comprises displaying one or more quality levels for printing in the online marketplace.

11. The method of claim 1, wherein the displaying the printer capability in the online marketplace comprises displaying one or more of a troubleshooting device and a troubleshooting service in the online marketplace.

12. The method of claim 1, wherein the displaying the printer capability in the online marketplace comprises displaying one or more color options in the online marketplace.

13. The method of claim 1, further comprising:
    determining one or more printer capabilities on the printing device capable of being enabled.

14. A system for printer driver based marketing, the system comprising:
    a computer; and
    a non-transitory memory in communication with the computer, wherein the non-transitory memory contains one or more programming instructions for performing the following when executed:

receiving, at an online marketplace, status information from a printer driver in a computing device, wherein the printer driver is associated with a networked printing device in communication with the computing device, automatically determining a printer capability to offer based on the status information, wherein the printer capability is compatible with the networked printing device and is not enabled on the networked printing device, displaying the printer capability in the online marketplace, receiving a request to purchase the printer capability for the networked printing device, and downloading an update to the printer driver enabling the printer capability for the networked printing device.

15. The system of claim 14, wherein the one or more programming instructions further comprise one or more programming instructions for tracking the usage of the printer capability.

16. The system of claim 14, wherein the one or more programming instructions for downloading an update to the printer driver comprise one or more programming instructions for downloading one or more of an enhanced photo feature, a printing speed, a quality adjustment capability, a color correction capability, a printer mode, a duplex capability and a networking capability.

17. The system of claim 14, wherein the one or more programming instructions for downloading an update to the printer driver comprise one or more programming instructions for installing the update to the printer driver in the computing device.

18. The system of claim 14, wherein the one or more programming instructions for displaying the printer capability in the online marketplace comprise one or more programming instructions for displaying one or more printer paper quality options in the online marketplace.

19. The system of claim 14, wherein the one or more programming instructions for displaying the printer capability in the online marketplace comprise one or more programming instructions for displaying one or more quality levels for printing in the online marketplace.

20. The system of claim 14, wherein the one or more programming instructions for displaying the printer capability in the online marketplace comprise one or more programming instructions for displaying one or more of a troubleshooting device and a troubleshooting service in the online marketplace.

* * * * *